July 2, 1963

J. N. BINNS 3,095,770

CONTOUR ROLL-TURNING LATHE

Filed Oct. 26, 1959

INVENTOR.
JACK N. BINNS
BY
*J. Warren Kinney, Jr.*
ATTORNEY

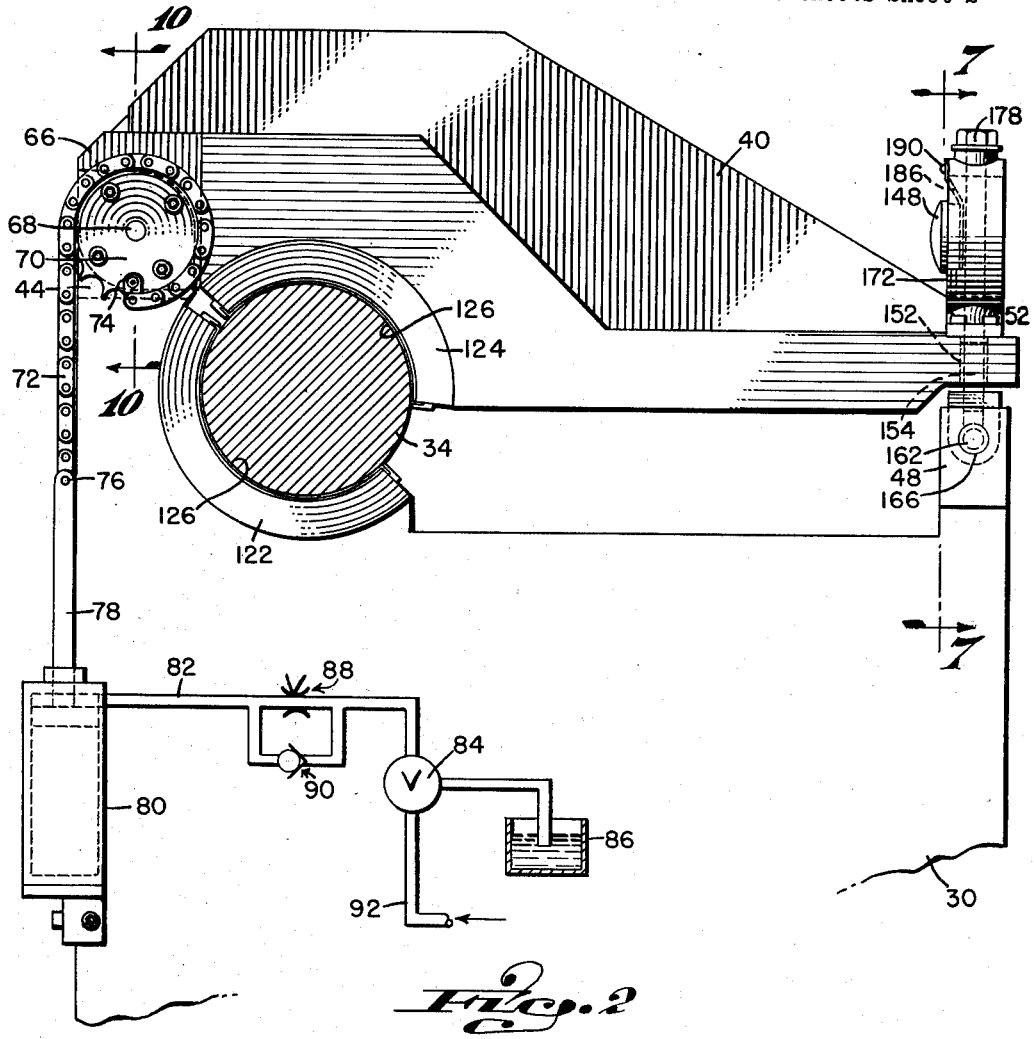

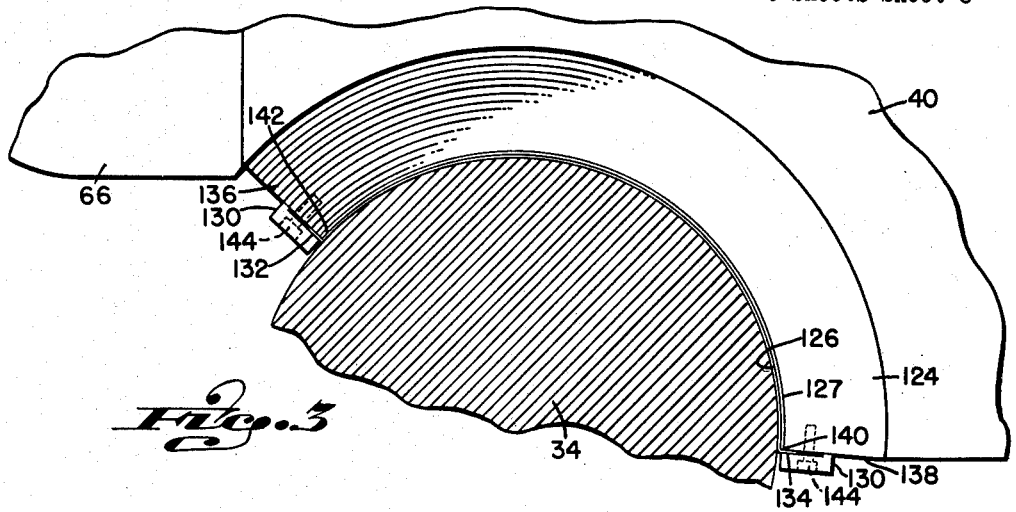
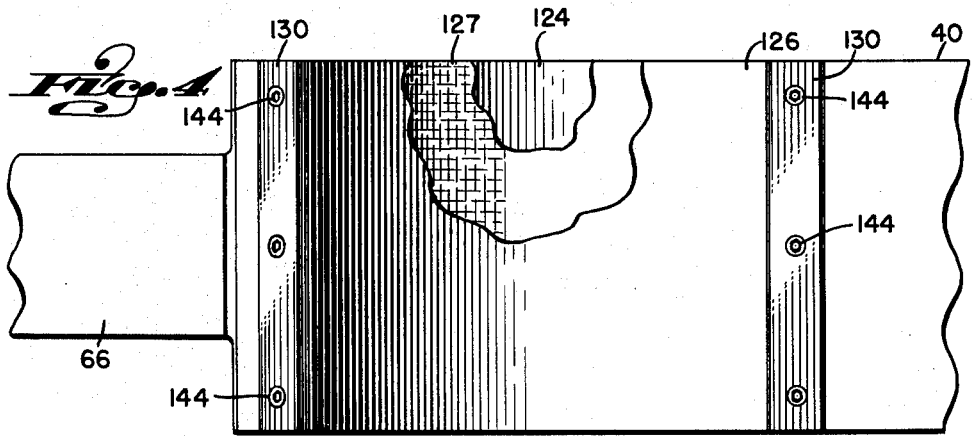
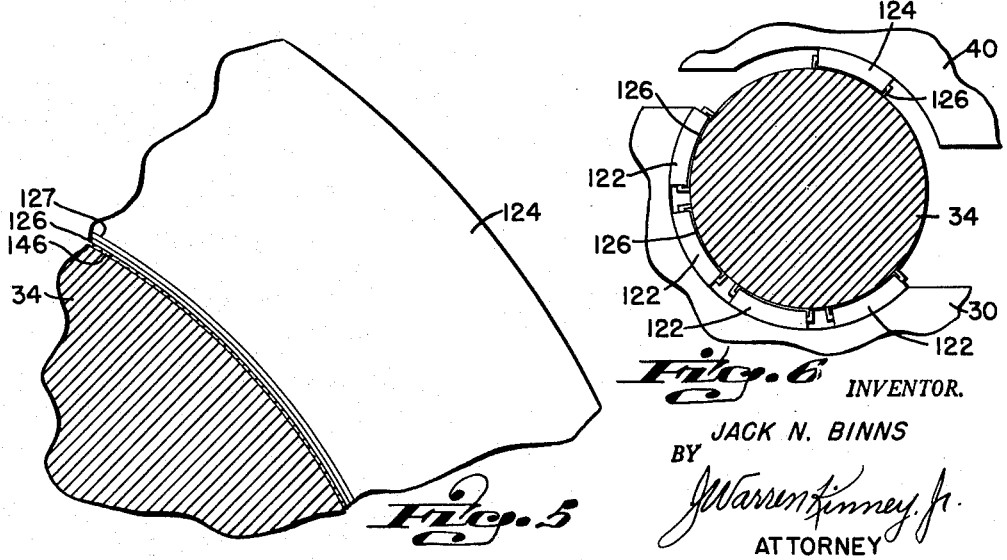

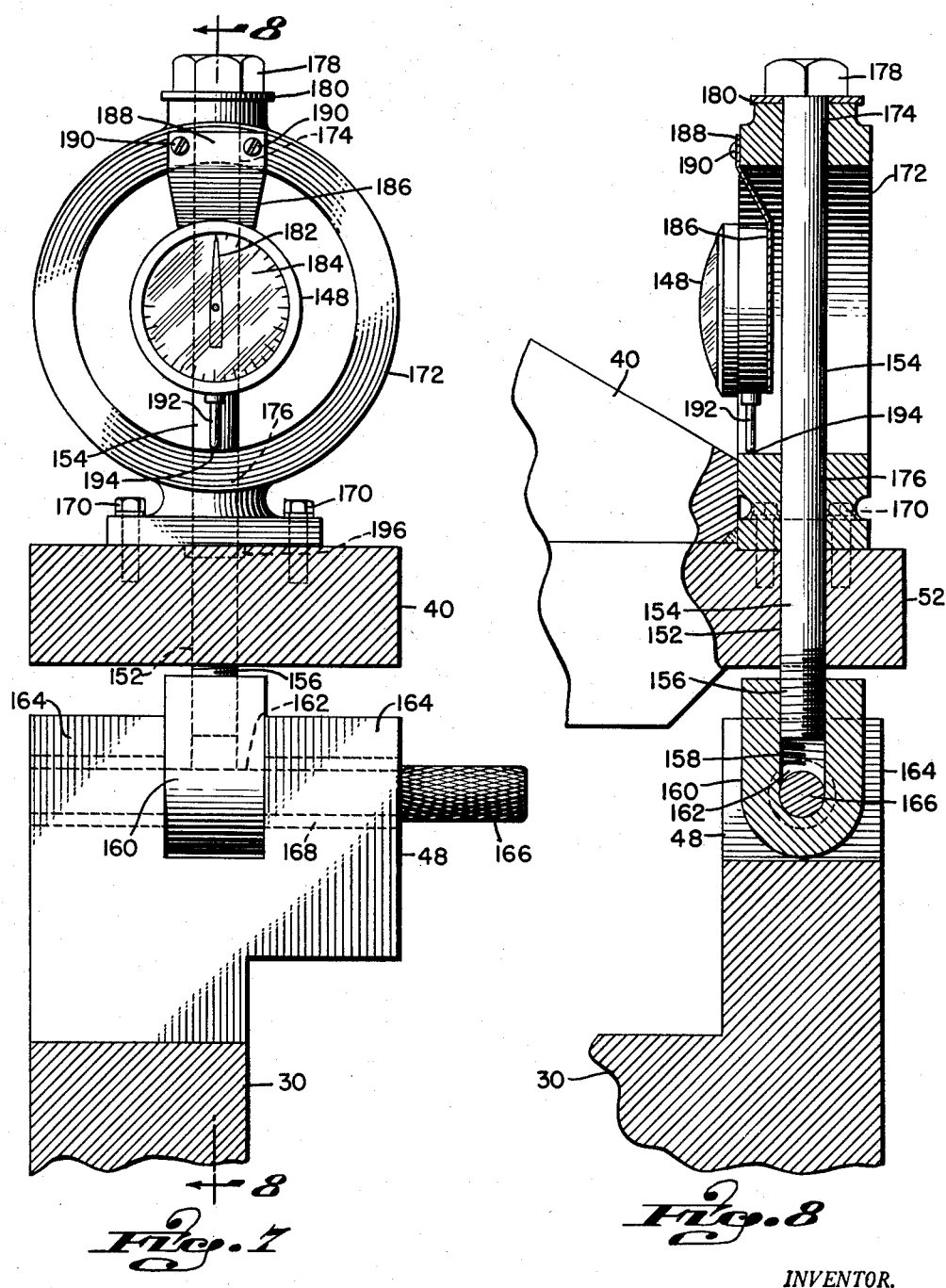

July 2, 1963

J. N. BINNS 3,095,770

CONTOUR ROLL-TURNING LATHE

Filed Oct. 26, 1959

INVENTOR.
JACK N. BINNS
BY
J. Warren Kinney Jr.
ATTORNEY

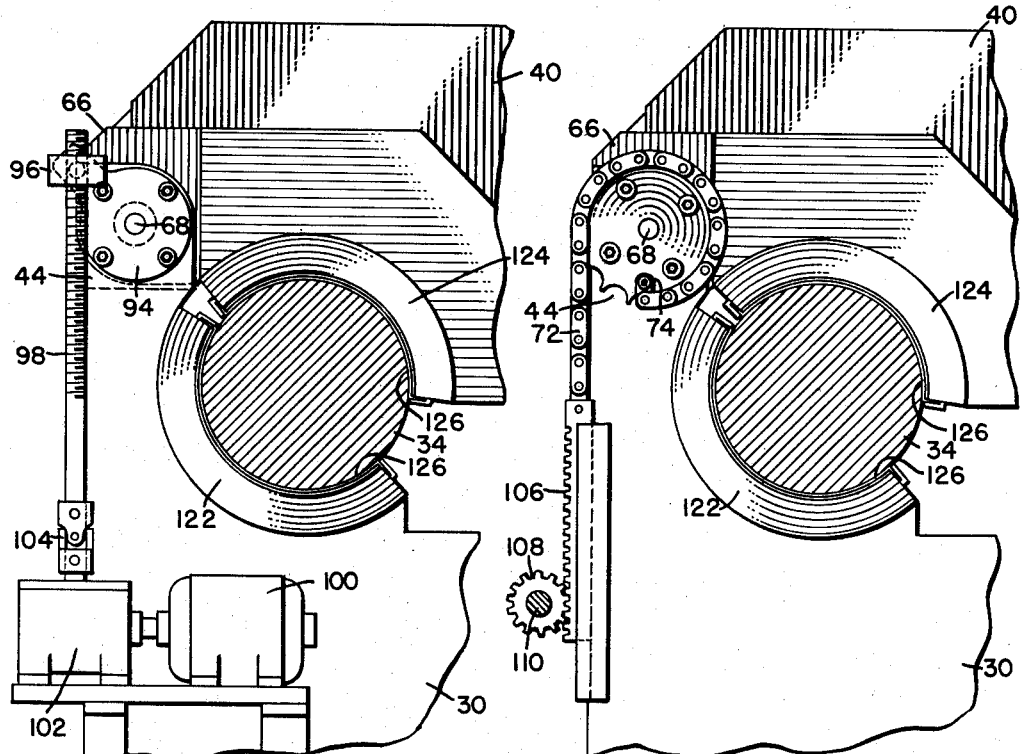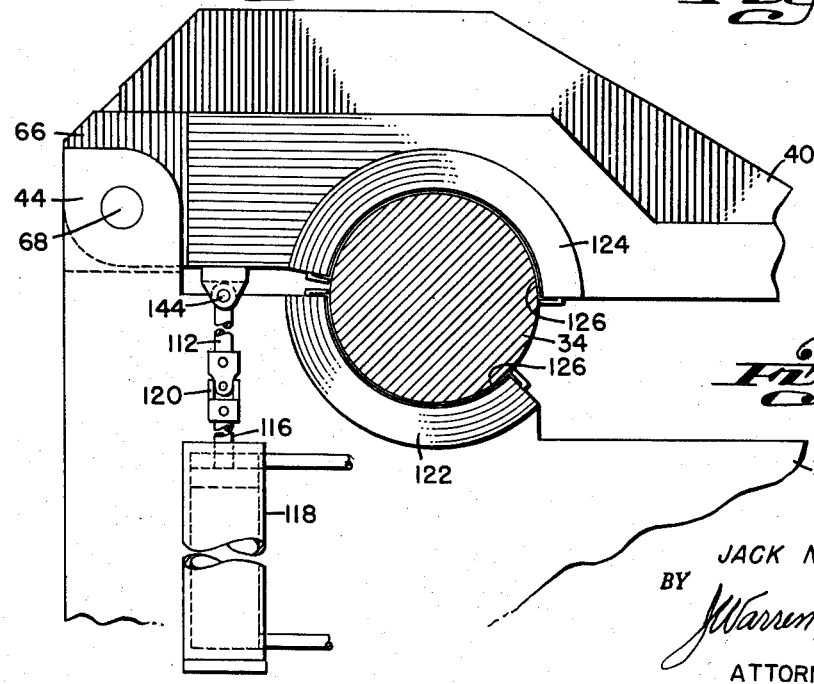

United States Patent Office 3,095,770
Patented July 2, 1963

3,095,770
CONTOUR ROLL-TURNING LATHE
Jack N. Binns, 4886 Oaklawn Drive, Cincinnati, Ohio
Filed Oct. 26, 1959, Ser. No. 848,751
12 Claims. (Cl. 82—2)

The present invention relates to improvements in lathes of the heavy duty type, such as are used in turning and shaping large rolls of the general character employed in rolling metal sheets, bars, and other shapes, as well as heavy rolls for other purposes.

An object of the invention is to facilitate and expedite the machining of large and heavy mill rolls, with substantial savings of time, labor, and expense.

Another object is to enhance the accuracy of machining and finishing heavy rolls of the type above mentioned.

Another object of the invention is to provide improved means in a roll turning lathe, for so supporting the necks of the rolls during the machining operation as to greatly reduce wear and servicing of the machine elements, thereby enhancing the efficiency of the operation.

A further object is to provide means for quickly and easily retaining and releasing the roll necks, incident to turning of the rolls, with equalization of pressure upon the roll necks throughout the machining operation, this resulting in high accuracy and fine finishing of the rolls, as well as an even wearing of certain bearing liners which require replacement from time to time.

Another object of the invention is to provide improved means for extending the useful life of the liners of bearings which rotationally support the roll necks in the course of the roll machining operation.

Still another object of the invention is to provide dynometer means in conjunction with the housing cap assemblies for enabling the radial load applied to the roll supporting journals to be not only accurately ascertained but also conveniently changed or controlled by a simple manipulation on the part of the operator.

The foregoing and other objects are attained by the means described herein and illustrated upon the accompanying drawings, in which:

FIG. 2 is an enlarged fragmental cross-sectional view of an improved housing cap, including lifting means therefor and a flow control valve, which embody the improvements of the present invention.

FIG. 3 is a fragmentary enlarged cross-sectional view of a roll neck confined by the improved housing cap and bearing means.

FIG. 4 is a bottom view in plan, showing the housing cap and bearing means, the roll neck being omitted from the illustration.

FIG. 5 is a greatly enlarged detail view of a portion of FIG. 3.

FIG. 6 is a fragmentary cross-sectional view on a reduced scale, showing a modification of the FIG. 2 housing cap and bearing means.

FIG. 7 is an enlarged cross-sectional view taken on line 7—7 of FIG. 2, showing a bearing pressure indicating and regulating means.

FIG. 8 is a cross-sectional view taken on line 8—8 of FIG. 7.

FIG. 11 is a fragmental cross-sectional view, illustrating a modification of the housing cap lifting means of FIG. 2.

FIG. 12 is a view similar to FIG. 11, showing a second modification of the housing cap lifter.

FIG. 13 is a view similar to FIG. 11, showing a third modification.

The present application is a continuation in part of my co-pending application Serial No. 648,396, filed March 25, 1957, now Patent No. 3,022,690 issued February 27, 1962. The lathe therein disclosed is basically the type of machine with which the improvements of the instant application are concerned.

Figure 1:
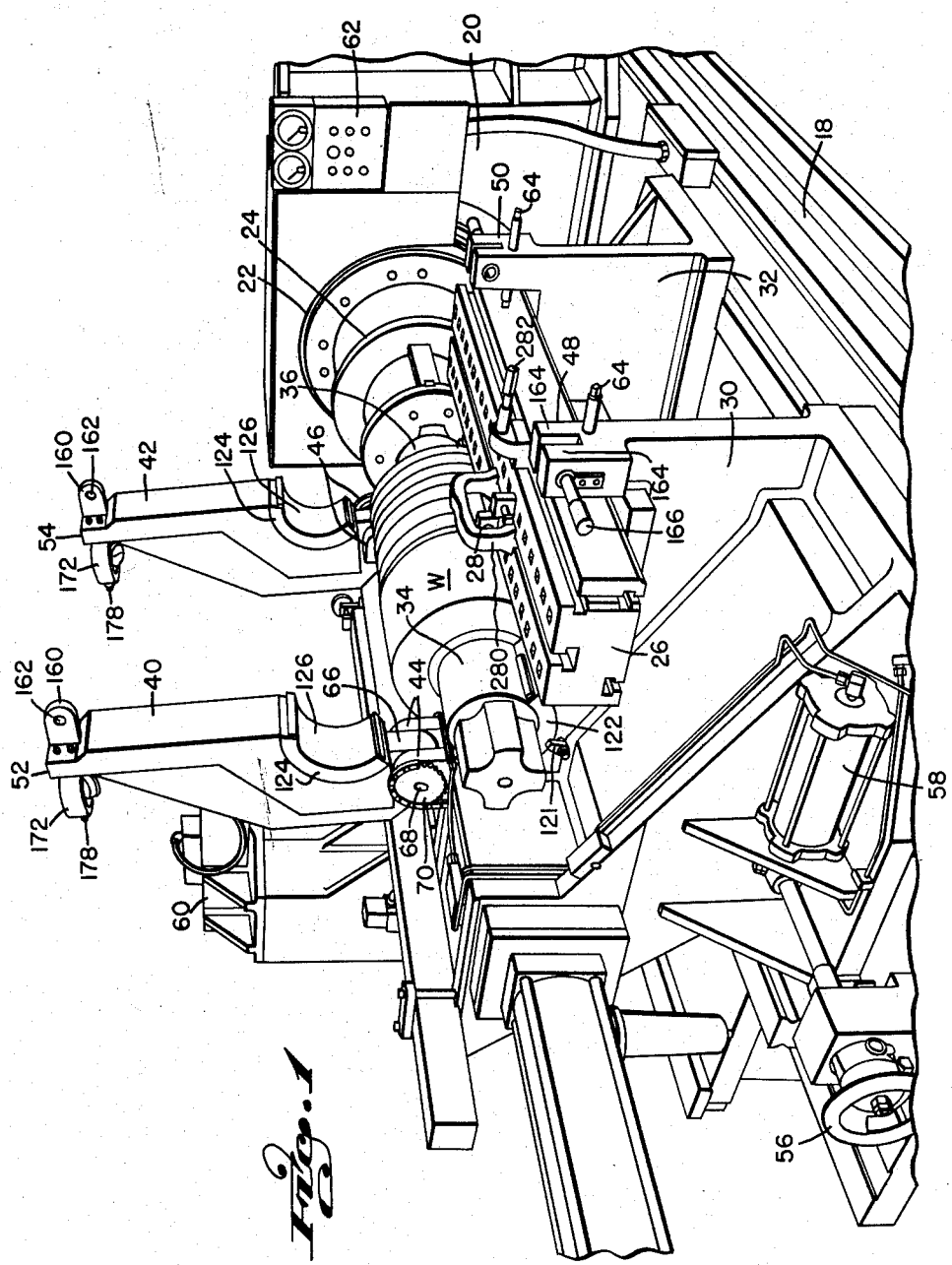
FIG. 1 is a fragmentary perspective view of a roll turning lathe embodying the improvement of the present invention, and showing a roll or workpiece in position to be machined.

Referring to FIG. 1, the roll lathe comprises a bed 18 carrying a headstock 20 which includes a motor, not shown, that drives a face plate 22. The face plate carries suitable chucking means indicated generally at 24, to transmit rotation of the drive motor shaft, through a reducing gear within the headstock, to the roll or workpiece W. The workpiece usually is rotated at very slow speed while undergoing machining.

It will be understood that suitable tools, not illustrated, will be utilized to perform the machining operations. Such tools may be supported upon an adjustable rest such as 26 between a pair of side stops, one of which is indicated by the numeral 28, and beneath a yoke 280. A jack screw 282 may be utilized to force the tool into the work during the cutting operation.

The tool rest illustrated may be supported upon a pair of spaced parallel standards 30 and 32, properly referred to as neck housings, which support the workpiece or roll W at its necks 34 and 36. The neck housing 32, being in proximity to the headstock of the lathe, is preferably fixed with relation to the bed 18, whereas the other neck housing 30 may be shifted to various positions along the length of the bed and there locked, to provide support for rolls or workpieces of different lengths. Any suitable means may be employed to move the housing 30 and lock it at various locations upon the lathe bed. Such means may be conventional, employing any known expedients for the purpose.

For the purpose of retaining the roll or workpiece during the machining operation, there is provided a pair of swingable neck housing cap elements 40 and 42, adapted to be swung downwardly over the roll necks 34 and 36, respectively, to journal the roll necks for rotation of the roll during the machining operation.

The cap elements 40 and 42 may be hinged to spaced upstanding ears 44 and 46 formed integrally upon the neck housings 30 and 32, rearwardly of the roll or workpiece W. At the forward portions of housings 30 and 32 may be located a pair of latching devices indicated generally by the characters 48 and 50, the purpose of which is to secure the swinging ends 52 and 54 of the neck housing cap elements when lowered onto the roll necks. In the elevated position of FIG. 1, the cap elements 40 and 42 will, of course, permit bodily removal of the roll or workpiece from the machine.

It may here be noted that such controls and mechanisms as are indicated at 56, 58, 60, 62 and 64 have no bearing upon the improvements with which the present invention are concerned, wherefore any detailed disclosure pertaining thereto is deemed unnecessary and superfluous.

The neck housing cap elements 40 and 42 are identical in form and function, wherefore an explanation of one should suffice for the other also. As is most clearly illustrated upon FIGS. 1 and 2, the cap element 40 may have a transversely drilled integral tongue 66 carrying a hinge pin 68 locked therein as by means of a key member 71, FIG. 10, the pin thereby serving to hinge the cap element between the ears 44 of the lower or base neck housing 30. Upon one end of hinge pin 68 may be fixed a wheel or sprocket 70, or equivalent means, to be power rotated for swinging the cap element 40 about its hinge connection at 68. Several examples of power means for actuating the cap element are shown in the drawings. As in FIG. 2, a chain or the like 72 may be trained over the sprocket and anchored thereto at 74, with the free end of the chain fixed at 76 to the plunger 78 of a hydraulic motor or cylinder 80. Upon directing hydraulic fluid to the cylinder by way of tube 82, the plunger 78 will be forcibly lowered, as will be understood, to elevate the cap element 40 at its free end 52, FIG. 9, thereby to free the roll neck 34.

Figures 9, 10:
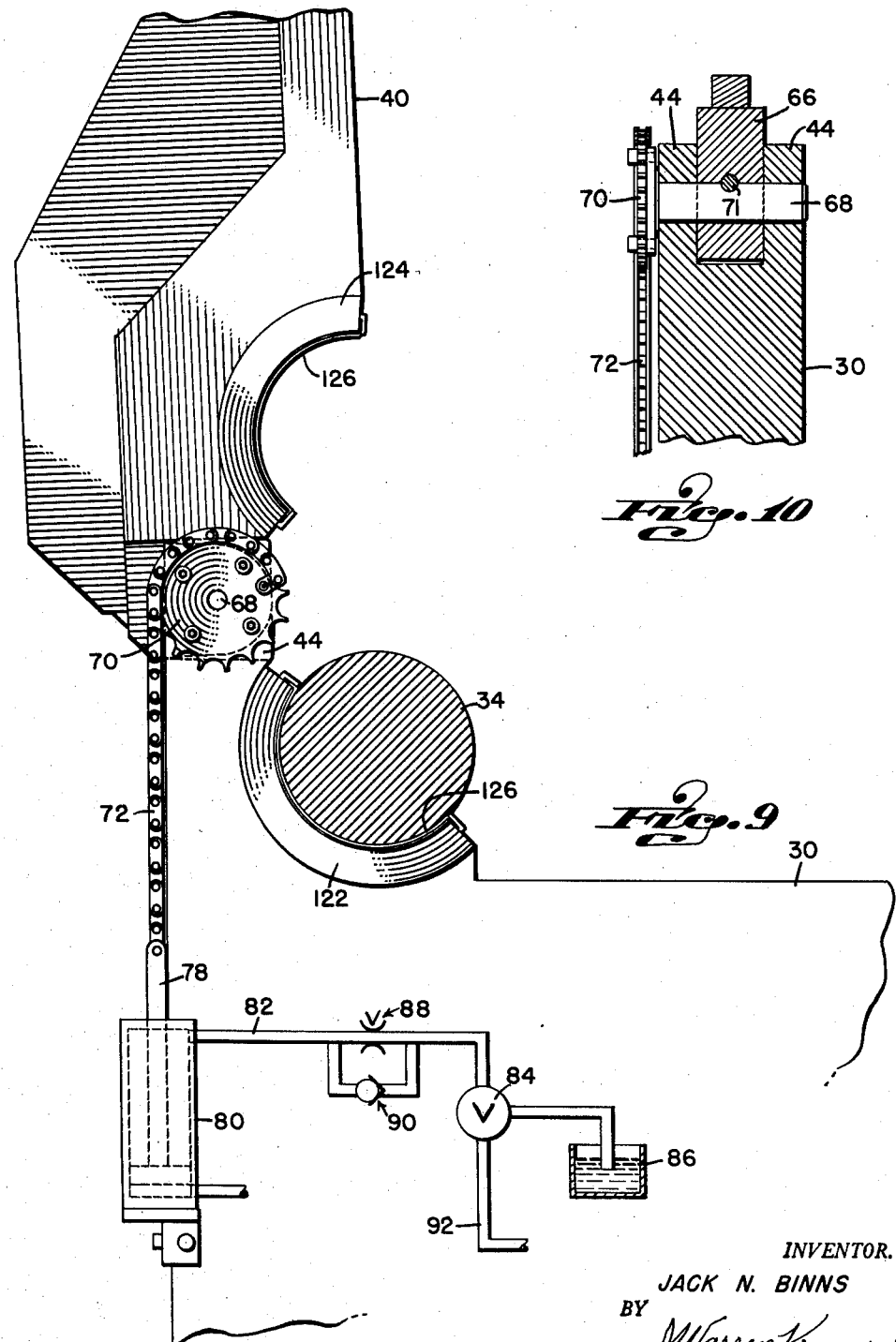
FIG. 9 is a view similar to FIG. 2, showing the housing cap assembly in a displaced inoperative or full open position.
FIG. 10 is a fragmentary cross-sectional view taken on a vertical plane through the sprocket of FIG. 9.

When the cap element 40 is to be lowered to operative position, the three-way valve 84 may be manipulated to relieve pressure of fluid from the cylinder, into the reservoir 86, thereby permitting the cap element to lower by gravity to the FIG. 2 operative position. A metering valve and a check valve in the hydraulic system are indicated diagrammatically at 88 and 90, respectively, to control the cap element movements. If desired, the cap element may be so hinged as to pass dead center when moved to the elevated position, where it will remain until the operator manually pulls it forwardly to initiate movement thereof to the lowered or operative position. In FIGS. 2 and 9, the hydraulic fluid pressure line is indicated at 92.

FIGS. 11, 12 and 13 show variant forms of power means to elevate and lower the cap element 40. In FIG. 11, for example, the sprocket is replaced by a wheel or disc 94 carrying a nut pivoted thereon, the nut engaging the threads of a screw 98 to be rotated in opposite directions by means of an electric motor 100. The motor may drive the screw through the intermediary of a speed reducer 102 and a universal joint 104.

In FIG. 12, a rack and pinion arrangement 106—108 serves to elevate the cap element 40, the pinion shaft 110 being rotatable in opposite directions selectively by means of suitable motor equipment, not shown.

In the modification of FIG. 13, a connecting rod 112 pivoted upon the cap element at 114, and having universal joint connection with the plunger 116 of a double-acting fluid motor 118 at 120, provides for elevating and lowering the cap element 40 about its pivotal mounting 68. In this instance, the pivot or pin 68 need not be keyed to the cap element, since power is applied directly to the cap element at 114 rather than to the pin 68. This means of actuating the swinging cap element, like those of FIGS. 9, 11, and 12, is representative of various ways which might be adopted for swinging the cap element to operative and inoperative positions selectively.

Attention is now directed to the improved bearing means whereby the necks of the roll W are supported for rotation during machining or finishing of the roll. An arcuately formed base bearing shoe is indicated at 122, this shoe being either integral with or fixed upon the neck housing 30 near the hinge 68. The inside face of the shoe is exposed upwardly to receive and support the neck 34 of a roll or workpiece W lowered onto the shoe. The arcuacy of the bearing area of the shoe corresponds to that of the roll neck, with certain tolerance provided for lining the shoe as will be explained. This applies also to the complementary shoe 124 which is integral with or fixedly applied to the swingable cap element 40.

The shoes 122 and 124 are to be lined with an expendable liner 126 of thin bearing material such as "Micarta" or "nylon" plastic, or copper or silver alloy sheet, or any other suitable sheet material of uniform thickness; and such bearing material is to be backed up with a compressible cushioning material in sheet form interposed between the shoe and the bearing material. The cushion material 127 should be of limited thickness, and should be characterized by resiliency and uniformity of thickness throughout.

I have found that tag board or paper, measuring .010 to .025 in thickness, furnishes excellent cushioning for the bearing material liner. Paper so used should be of medium soft grade, possessing the qualities of resiliency and uniformity of thickness.

Tests have proven that bearing liners such as 126 made of thin bearing-metal sheet aproximating .004 to .010 in thickness, when backed up with cushioning sheet as above explained, rendered service in supporting the rotating roll necks, for periods of time up to 200 hours; whereas the same kind of liners not so backed up, wore out in about five hours. It is evident that the resilient thin backing material increases the life of the expendable bearing-metal liner by approximately forty times the normal life span. Bearing-metal liners used in the shoes and cushioned by the backing sheet, appear to be protected against concentration of load such as would promptly wear holes in the bearing-metal liners in the absence of such backing material.

The improvement above disclosed results in very important and valuable advantages. In addition to effecting a substantial saving of bearing material, it minimizes drastically the loss of time heretofore experienced in the frequent replacement of bearing liners and consequent loss of use of the machine during such shut-down time.

As illustrated by FIGS. 3 to 5, it is considered advantageous to employ clamp means such as transverse bars 130, to anchor the opposite turned ends or flanges 132 and 134 of the liner against the opposite ends 136 and 138 of the shoes, to preclude any tendency of the liner to rotate with the roll neck 34. The cushion sheet 127 preferably has plain inturned ends 140 and 142 which are free of any restraining pressure except that which is incidental to securement of the liner 126 upon the shoe. The cushion sheet preferably covers completely the concave face area of the shoe, and its ends 140 and 142 substantially should abut the flanges 132 and 134 of the liner. The clamp bars 130 may be detachably secured to the shoe ends by means of screws 144 or other suitable fastening devices.

In FIG. 5, the liner 126 of bearing material is shown backed up with the cushion sheet 127, and spaced from the roll neck 34 by an oil film indicated at 146.

According to the modification illustrated by FIG. 6, the shoes 122 and 124 instead of being continuous about the roll neck 34, are applied in sections to the neck housing elements 30 and 40, and each shoe section is individually armored with a bearing liner 126 in the manner heretofore explained. This type of construction may be preferable when the rolls to be machined, and the necks thereof, are very large in diameter.

In order to achieve uniformity in wearing of the bearing liners 126 at opposite ends of the roll undergoing machining, so that liner replacements may be simultaneously accomplished, the invention contemplates application of equal bearing pressures at all times upon the roll necks. This is accomplished with the use of a pair of dynamometers, indicated at 148 and 150 of FIG. 1. Inasmuch as the dynamometer application is the same on each of the identical neck housing cap elements 40 and 42, a description of one will suffice for the other also.

Referring to FIGS. 1, 2, 7 and 8, it may be noted that the outer end 52 of cap element 40 is drilled vertically at 152 to slidably receive a clamp bolt 154. The threaded lower end 156 of the bolt engages the internal threads 158 of a latch bolt 160, which may be in the form of a depending block transversely apertured at 162. Upon lowering of the cap element 40 about its pivotal mounting 68, the bolt 160 will enter the space between the upstanding arms 164 of latching device or keeper 48, provided, of course, that the bolt retaining pin 166 is first withdrawn, FIG. 1.

After latch bolt 160 has dropped into the space between the arms 164—164, it may be locked therein by sliding the pin 166 through the hole 162 of the latch bolt.

As will be understood, the retaining pin 166 is slidable within a transverse bore 168 that traverses both arms 164 of the keeper, to span the space or pocket between said arms. When the pin 166 is pulled outwardly, as shown in FIG. 1, the arms may receive the bolt 160 between them; subsequent advancement of the pin to the FIG. 7 position locks the bolt 160 to the arms, as is evident.

Mounted securely atop the end portion of cap element 40, by means of bolts or the like 170, is a hollow ring 172 of resilient metal strongly resistive to distortion diametrally. This ring has vertically aligned holes 174 and 176 through which the clamp bolt 154 extends, with the head 178 of the bolt bearing upon the top of the ring, or upon an intervening washer 180. When the head of the bolt is rotated to advance the bolt (FIG. 8) into the threaded bore of part 160, the cap element 40 will be forced downwardly until the movable shoe 124 and its liner bear strongly upon the roll neck 34; and the tighter the bolt is drawn, the greater will be the distortion of ring 172 along its vertical diameter.

The degree of distortion mentioned above will be indicated upon the dynamometer indicator 148, which may include a pointer 182 adapted to sweep a calibrated dial 184. From this it will be apparent that the machine operator may tighten the bolts 154 at both of the cap elements 40 and 42, until identical readings are obtained at both dynamometer indicators, thereby to impose equal forces upon the bearings at both necks of the roll undergoing machining. By this means, equal wearing of the bearing liners of the cap elements 40 and 42 may be established.

Mounting the dynamometer indicator in operative relationship to the resilient ring 172 may be achieved in various ways. In the example illustrated, the case of the dynamometer indicator is provided with a fixed back plate or bracket 186 having an end 188 fixed, as by means of screws 190, to the upper portion of the ring where distortion is most pronounced. With the case so mounted upon the ring, and preferably partly within it as shown, FIG. 8, the reciprocable actuating pin 192 of the dynamometer indicator should bear upon the inner surface of the ring at 194, directly opposite the bolt head 178, or on the diametral line of greatest deflection. A preloaded condition of the dynamometer indicator is to be preferred, when the ring is normally undistorted, in order to obtain sensitive readings.

As indicated at 196, FIG. 7, the base of the dynamometer ring may have a depending annular boss fitted into a corresponding counterbore of element 40, for maintaining proper positioning and alignment of the ring with respect to bolt 154.

By reason of the construction above described, the necks at opposite ends of any roll undergoing machining may be at all times embraced by their respective bearings, with equal force. The operator of the lathe is afforded a visual indication of the bearing pressures at all times, and may adjust them individually whenever a readjustment seems necessary or desirable to obtain maximum efficiency in the operation of the roll turning lathe.

In conclusion, it should be evident that the improvements of the present invention result in greater efficiency of production than has been possible heretofore in the field of heavy roll manufacture. Production costs thereby have been materially reduced. Due to the improvements disclosed, the machine may be kept in service with a minimum of shutdown time and hand labor involved in the manufacturing procedure, all of which expedites and facilitates production with beneficial savings resulting.

In the preferred embodiment of the invention a swing clamp 121 (FIG. 1) is suitably bolted to the housing whereby to bear against the outer end of neck housing shoe 122. In this manner I have provided simple yet highly effective means for pushing the shoes axially along the roll toward the thrust face of the roll itself.

It is to be understood that various modifications and changes in the structural details of the apparatus may be resorted to, within the scope of the appended claims, without departing from the spirit of the invention.

What is claimed is:

1. Mechanism for rotatably supporting a roll workpiece by end journal portions thereof, comprising in combination a pair of spaced open bearings for reception of end journal portions of a roll or workpiece, and a second pair of cooperating open bearings movable into position to overlie said first pair of bearings to engage and retain the said end journal portions in position on said first pair of bearings, means supported upon the individual second pair of bearings for establishing maximum accuracy of axial rotation and equalized terminal rotational resistance of a workpiece with respect to the mechanism during rotation of the workpiece, said means including individual pressure clamping means for urging the individual bearings of the second pair in the direction of the respective bearings of the first pair to secure the workpiece therebetween, said pressure clamping means each further including a sensitive pressure indicator, said pressure indicators being correspondingly calibrated whereby said clamping means may be set and maintained at effective pressures establishing desired radial loads on the workpiece journals for and during a machining operation irrespective of varying bearing conditions.

2. The mechanism as set forth in claim 1, in which said pressure indicator means include distortion resisting ring member individual to each of said second pair of bearings, and in which the pressure clamping means comprise locking bolts extending diametrically through said ring members into engagement with the machine and have portions exteriorly engaging the rings to apply their clamping pressure to the second pair of bearings by way of said rings, and indicators carried by the rings having deflectable measuring portions effective in parallelism with the bolts for measuring distortion of the rings and thereby the amount of clamping pressure.

3. Mechanism for rotatably supporting a roll workpiece by end journal portions thereof, comprising in combination a pair of spaced open bearings for reception of end journal portions of a roll or workpiece, and a second pair of cooperating open bearings movable into position to overlie said first pair of bearings to engage and retain the said end journal portions in position on said first pair of bearings, means for establishing maximum accuracy of axial rotation and equalized terminal rotational resistance of a workpiece with respect to the mechanism during rotation of the workpiece, said means including thin, flexible liners in the bearings for direct engagement with the journals of the workpiece, a thin, compressible paper backing disposed in abutting relationship with each of said liners, individual pressure clamping means carried by the individual second pair of bearings for urging the individual bearings of the second pair in the direction of their respective bearings of the first pair to secure the workpiece therebetween, said pressure clamping means each including a sensitive pressure indicator, said pressure indicators being correspondingly calibrated whereby said clamping means may be set and maintained at effective pressures establishing desired radial loads on the workpiece journals for and during a machining operation irrespective of varying bearing and liner conditions.

4. Mechanism for rotatably supporting a roll workpiece by end journal portions thereof, comprising in combination a pair of spaced open bearings for reception of end journal portions of a roll or workpiece, and a second pair of cooperating open bearings movable into position to overlie said first pair of bearings to engage and retain the said end journal portions in position on said first pair of bearings, means supported upon the individual second pair of bearings for establishing maximum accuracy of axial rotation and equalized terminal rotational resistance of a workpiece with respect to the mechanism during rotation of the workpiece, said means including individual pressure clamping means for urging the individual bearings of the second pair in the direction of the respective bearings of the first pair to secure the workpiece therebetween, said pressure clamping means each including a sensitive pressure indicator, said pressure indicators being correspondingly calibrated whereby said clamping means may be set and maintained at effective pressures establishing desired radial loads on the workpiece journals for and during operative rotation of the workpiece irrespective of varying bearing conditions, said pressure indicator means further including distortion resisting ring members indivdual to and carried by each of said second pair of bearings, and in which the pressure clamping means comprise locking bolts extending diametrically through said ring members and having operative attachment to the first mentioned bearings and also having portions exteriorly engaging the rings to apply their clamping pressure to the second pair of bearings by way of said rings, and indicators carried by the rings having deflectable measuring portions effective in parallelism with the bolts for measuring distortion of the rings and thereby the amount of clamping pressure, said ring members being of size to provide protective supporting frames for the indicators, supporting brackets affixed to the upper portions of the ring members where the distortion tendency is most pronounced, said brackets having portions depending within the rings and supporting the body of the indicators adjacent the locking bolts and with their deflectable measuring portions adjacent the bolts within the facial planes of and protected by the rings.

5. A roll neck rest for a heavy lathe rotated work roll, said rest comprising a base neck housing including a fixed lower bearing shoe for receiving and supporting a work roll neck, an elongate movable neck housing cap element having a transversely apertured forward end and a rear end and including a complementary work roll neck receiving upper bearing shoe, means hinging the said rear end of said movable cap element relative to said base housing for movement between an inoperative raised position and an operative lowered position, a clamp bolt having a head on one end and a threaded opposite end slidable in the said transverse aperture of said cap element, a latch bolt having a threaded bore and a plain bore at right angles thereto, the threaded bore accommodating the threaded end of said latch bolt, a keeper on the stationary neck housing in position to receive said latch bolt when the movable cap element is in a lowered operative position, said keeper including a pin receptive in the said plain bore of said latch bolt, a resilient ring having a pair of aligned openings on a diameter of the ring, said openings slidably embracing said clamp bolt, with the head of said clamp bolt abutting the ring exteriorly thereof, the said clamp bolt extending through the ring openings and the said transverse aperture of the cap element for engagement of its thread with the thread of said latch bolt bore, said ring abutting the cap element at the diametrical opening thereof opposite from the said clamp bolt head, and a dynamometer indicator mounted within the said ring and including an actuator responsive to distortion of the ring incident to actuation of the said clamp bolt for tightening said bearing shoes about a work roll neck.

6. The invention according to claim 5, wherein the said upper and lower bearing shoes are lined with flexible bearing elements backed up with resilient cushioning means distortable under load to conform to the surface of the work clamped between the said shoes and preclude uneven load concentration on the bearing elements, the said cushion means imparting a resiliency factor to said shoes.

7. A roll neck rest for a heavy lathe rotated work roll, said rest comprising a base neck housing including a fixed lower bearing shoe for receiving and supporting a work roll neck, an elongate movable neck housing cap element having a forward end and a rear end and including a complementary work roll neck receiving upper bearing shoe, means hinging the said rear end of said movable cap element relative to the base neck housing for movement between an inoperative raised position and an operative lowered position, and approximately paper thin flexible liner sheet of bearing material overlying the roll neck receiving surface of each of said bearing shoes, and an approximately paper thin cushion sheet of a resilient, inelastic fibrous material interposed between each liner sheet and the adjacent shoe surface whereby the said shoes resiliently bear upon a work piece neck positioned therebetween and engaging the liner sheets thereof, adjustable means connecting the forward end of the housing cap element with said neck housing for controlling the pressure with which the resiliently lined bearing shoes engage the roll neck, and means supported upon said movable housing cap element and operatively coupled with said base neck housing for precisely and continuously indicating the magnitude of the clamping pressure applied to the work by said shoes.

8. A journal box for receiving and rotatably supporting a neck portion of a heavy rotating work roll, a plurality of rigid segmental shoes within the journal box, an approximately paper thin flexible liner sheet of bearing material secured to, carried by and defining the bearing surface of each shoe, and an approximately paper thin cushion sheet of flexible, inelastic fibrous material interposed between each shoe and its associated liner sheet.

9. The combination with a journal box bearing shoe having a journal supporting surface, of a paper thin expendable liner sheet of bearing material overlying said journal supporting surface and secured to said shoe, and a paper thin sheet of cushioning material lying upon said supporting surface of said shoe between the shoe surface and the bearing material and engaging and supporting the bearing material, said sheet of cushion material being of unvarying thickness throughout, compressible and inelastic.

10. The invention according to claim 9, in which the said paper thin sheet of cushion material consists of medium soft paper of the class of tag board.

11. A bearing for rotatably supporting a heavy shaft of large diameter, comprising a supporting shoe having a concave surface substantially complementary to the area of a circular portion of the shaft to be supported, a thin flexible liner sheet of metallic bearing material fitted to the concave surface of the supporting shoe to contact and support the said circular portion of the shaft for rotation, and a thin sheet of cushioning material of approximately two times the thickness of said liner sheet interposed directly between and lying against both the said liner material and the said concave surface of the shoe, the said cushioning sheet being formed of a fibrous material characterized by compressibility, resilience, uniformity of thickness and substantial compressible strength.

12. The invention as set forth in claim 9, wherein the said expendable liner of bearing material has a thickness lying in the range of from and including 0.004" to and including 0.010" and the said cushion sheet has a thickness lying in the range of from and including 0.010" to and including 0.025".

References Cited in the file of this patent

UNITED STATES PATENTS

| | | |
|---|---|---|
| 134,229 | Thurston | Dec. 24, 1872 |
| 585,865 | Hamlin | July 6, 1897 |
| 1,219,935 | Gorton | Mar. 20, 1917 |
| 1,869,445 | Tomkins | Aug. 2, 1932 |
| 1,906,577 | Grone | May 2, 1933 |
| 1,955,658 | Rodde | Apr. 17, 1934 |
| 2,010,662 | Geer | Aug. 6, 1935 |
| 2,140,565 | Sevenson | Dec. 20, 1938 |
| 2,159,327 | Hendrick | May 23, 1939 |
| 2,337,629 | Shortell | Dec. 28, 1943 |
| 2,576,141 | Pike | Nov. 27, 1951 |
| 2,718,168 | Kendall | Sept. 20, 1955 |
| 2,830,486 | Dillon | Apr. 15, 1958 |
| 2,832,122 | Espari | Apr. 29, 1958 |
| 2,837,945 | Griffiths | June 10, 1958 |
| 2,865,259 | Blazek | Dec. 23, 1958 |
| 2,879,686 | Lewis | Mar. 31, 1959 |